Sept. 4, 1956   J. SIKLOSI   2,761,205
METHOD OF HOT WORKING A SCREWED DRILL PIPE JOINT
Filed Nov. 12, 1952
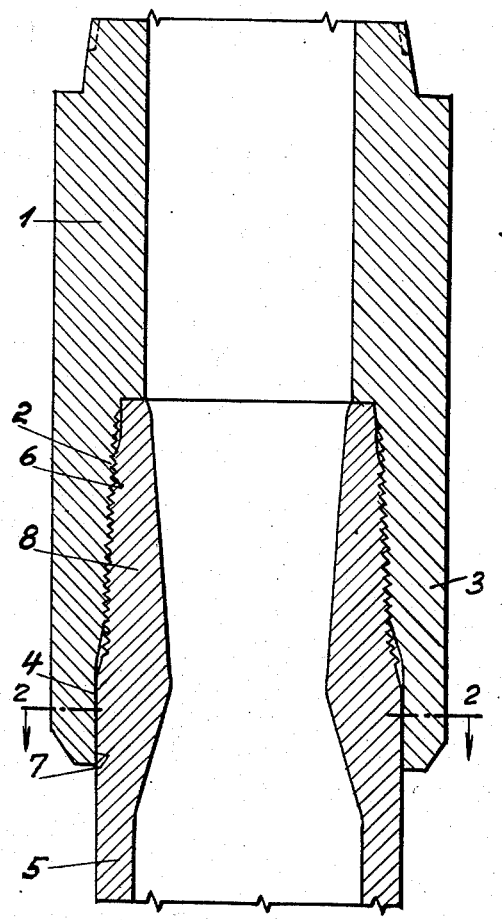
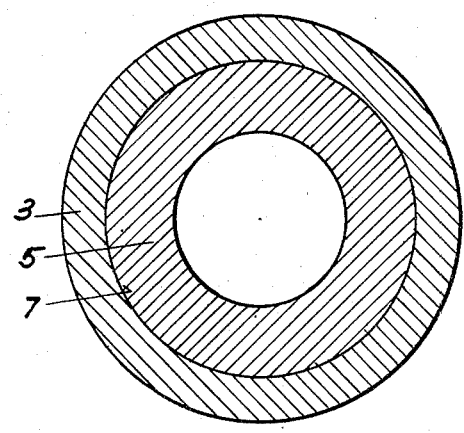
INVENTOR:
JOHANN SIKLOSI
BY:

2,761,205

METHOD OF HOT WORKING A SCREWED DRILL PIPE JOINT

Johann Siklosi, Vienna, Austria, assignor to Fa. Schoeller-Bleckmann Stahlwerke Aktiengesellschaft, Vienna, Austria Application November 12, 1952, Serial No. 319,959

Claims priority, application Austria September 23, 1952

1 Claim. (Cl. 29—447)

This invention relates to pipe assemblies and more particularly to a method of hot working drill pipes screwed to a tool joint.

The standardized thread used to connect the drill pipe and tool joint has the disadvantage that higher stresses effective at the runouts of the thread of the drill pipe lead to fatigue failure. To eliminate this risk and to achieve a more intimate connection of the drill pipe with the tool joint, it has been proposed to shrink the thread and the threadless lap of the tool joint on the mating thread and the threadless sealing surface of the drill pipe, at about 350 deg. C. A disadvantage of this type of assembly, in which the thread and the threadless lap of the tool joint must be designed with corresponding shrinkage allowances, resides in the very close tolerances for the diameters of the threads and of the threadless sealing surfaces of the tool joint and of the drill pipe. Moreover, the temperature rise of the thread of the tool joint has the disadvantage that it causes a change of the lead thereof as compared with the theoretical value and as a result that thread must be screwed with an incorrect lead on a drill pipe thread having a theoretically correct lead.

It is an object of the present invention to provide perfect sealing surfaces and a safety zone for the runouts of the thread, while maintaining the taper, and the flank diameter and thread profile of API standard threads and avoiding a temperature rise of the thread of the tool joint.

In the process according to the invention, this object is achieved in that a tight fit is produced between the threadless sealing surfaces of the tool joint and the drill pipe, and if desired also between the threads of the tool joint and the drill pipe, by a hot-working treatment consisting of expanding by means of rolls or a mandrel, pressing, forging or drawing, and performed after these two parts have been screwed together.

Thus it is a feature of the invention to provide in the process for the construction of pipe assemblies by screwing a fitting having a thread extending inwardly from a point spaced from one end of the fitting, on a correspondingly threaded pipe to cause a threadless sealing surface extending on said fitting between said end and said thread to lie adjacent to a threadless sealing surface of said pipe, the step of forcing said sealing surfaces together as a tight fit by a deforming treatment in hot condition effected after said fitting has thus been screwed on said pipe.

It is another feature of the invention to provide a pipe assembly which comprises a pipe fitting having a thread extending inwardly from a point spaced from one end of the fitting, and a correspondingly threaded pipe having said fitting screwed thereto, said fitting and said pipe having each a portion carrying a threadless sealing surface, said sealing surfaces tightly fitting each other, at least one of said portion being deformed in hot condition.

The two parts may be forced against each other e. g., by expanding the screwed drill pipe end, particularly its threadless sealing face, in diameter, preferably by means of rolls or a mandrel, to force the threadless sealing surface of the drill pipe to the threadless sealing surface of the tool joint.

In another embodiment of the process the parts to be connected are forced together into tight contact, by pressing, hammering, or drawing through a drawing die, the threadless lap of the tool joint, preferably in a hot state, on the threadless sealing surface of the drill pipe, after these parts have been screwed together.

To explain the process and the resulting assembly the drawing shows in

Fig. 1 an embodiment of a drill pipe assembly in longitudinal section, and in

Fig. 2 a cross sectional view taken along line 2—2 of Fig. 1.

According to Fig. 1 the tool joint 1 comprising the thread 2, the tubular end portion 3, and a threadless sealing surface 4, is screwed to the drill pipe 5 having a thread 6. Previously the lap 3 of the tool joint 1 was provided only to protect the runout of the thread and had no fixed connection to the drill pipe. According to the invention the drill pipe end 8, particularly the threadless sealing surface 7 of the drill pipe 5 and, if desired, also the thread 6 of the drill pipe 5, are expanded by rolling, e. g., on an automatic pipe caulking machine, or by means of a mandrel, to force them tightly against the threadless sealing surface 4 and the thread 2, respectively, of the tool joint and thus to obtain a tight fit between the lap 3 and the drill pipe 5. By this expanding step the physical properties of the pipe steel are influenced very favorably and all fits are achieved much more uniformly than by the known shrinking step.

Very tight and uniform fits are achieved by forcing the threadless tubular end portion 3 of the tool joint, in a heated state, on the threadless sealing surface 7 of the drill pipe 5, e. g., by pressing or by forging it thereon with a suitable forging device, or drawing it thereon through a drawing die. The threadless lap 3 is to be heated, if possible locally, to, e. g., about 850 deg. C., preferably by electric induction and, if necessary, while the adjacent thread 2 of the tool joint is cooled.

This tight fit of the threadless sealing surfaces can be improved to resist even torsional stress by roughing one of the sealing surfaces and forcing it tightly on the other sealing surface, which was previously heated. This may be accomplished, e. g., by roughing the threadless sealing surface 7 of the drill pipe 5 by milling them, locally heating the threadless lap 3 of the tool joint 1 to about 850 deg. C. after it has been screwed on the pipe, and pressing, or forging in a suitable die, the heated lap of the tool joint 3 on the drill pipe, or drawing it thereon through a drawing die.

By expanding the drill pipe by means of rolls or mandrel the theoretical diameter of the thread 6 of the drill pipe is influenced only to a tolerable extent, which has no detrimental effects in practice, whereas it is not altered at all by the step of pressing, forging, or drawing the threadless lap 3 of the tool joint thereon.

The threadless sealing surfaces 4 and 7 of the tool joint and of the drill pipe being forced against each other, they need not be turned bright.

When the threadless lap 3 of the tool joint is pressed, hammered, or drawn on the drill pipe 5, the threadless sealing surface 4 of the tool joint may be of a diameter larger than the threadless sealing surface 7 of the drill pipe, because it will be given a tight fit on the drill pipe in any case by the subsequent pressing.

I claim:

A method for attaching a drill pipe having an end portion formed with an outer thread and an annular threadless outer surface adjacent the outer thread to a steel tool joint formed with an inner thread and having a tubular end portion having an annular inner surface adjacent said inner thread, comprising the steps of screwing said tool joint over said drill pipe into a position in which said annular inner surface of said tubular end portion of said tool joint is located opposite and surrounding said annular threadless outer surface of said drill pipe; thereupon heating said tubular end portion of said tool joint; and mechanically deforming and pressing said heated tubular end portion of said tool joint in hot condition against said annular threadless outer surface to reduce the diameter of said inner annular surface whereby the same engages in a tight fit said outer threadless annular surface of said drill pipe.

References Cited in the file of this patent

UNITED STATES PATENTS

| Number | Name | Date |
|---|---|---|
| 105,290 | Allison | July 12, 1870 |
| 930,863 | Kearney | Aug. 10, 1909 |
| 1,101,729 | Davis | June 30, 1914 |
| 1,619,901 | Washburne | Mar. 8, 1927 |
| 1,735,563 | Deckard | Nov. 12, 1929 |
| 1,736,610 | Loffler | Nov. 19, 1929 |
| 1,817,808 | Eaton | Aug. 4, 1931 |
| 1,942,518 | Protin | Jan. 9, 1934 |
| 2,054,118 | Childs | Sept. 15, 1936 |
| 2,160,263 | Fletcher | May 30, 1939 |
| 2,202,261 | Osmun | May 28, 1940 |
| 2,234,957 | Boynton | Mar. 18, 1941 |
| 2,284,260 | Castellanos | May 26, 1942 |
| 2,318,590 | Boynton | May 11, 1943 |
| 2,363,990 | Priebe | Nov. 28, 1944 |
| 2,399,790 | Conroy | May 7, 1946 |
| 2,430,921 | Edelmann | Nov. 18, 1947 |
| 2,628,516 | Brace | Feb. 17, 1953 |
| 2,636,753 | Griffin | Apr. 28, 1953 |